Sept. 27, 1932.  K. HUGHES ET AL  1,879,264
STAND FOR POULTRY FOUNTAINS
Filed April 6, 1931
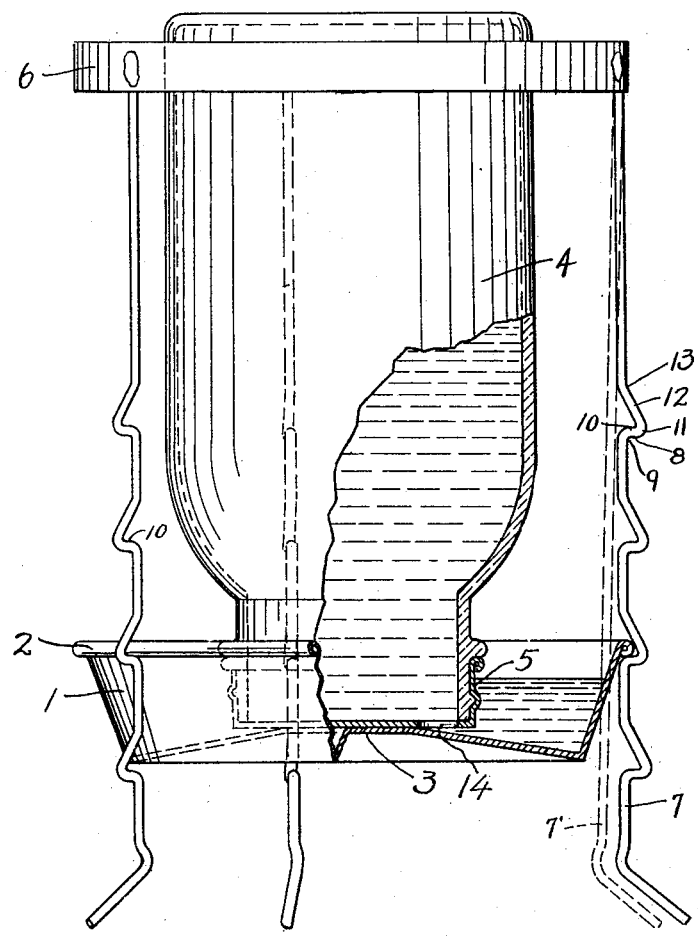
Inventors,
Kenneth Hughes and
Joseph Williams
By Minturn & Minturn
Attorneys.

Patented Sept. 27, 1932

1,879,264

UNITED STATES PATENT OFFICE

KENNETH HUGHES AND JOSEPH WILLIAMS, OF ELWOOD, INDIANA

STAND FOR POULTRY FOUNTAINS

Application filed April 6, 1931. Serial No. 527,982.

This invention relates to a stand for the support of poultry fountains, and more particularly for the support of fountains for the supply of water and milk to young chicks, a principal object of the invention being to provide means for regulating the height of the drinking pan above the floor or ground to suit the size of the chick, and to provide a ready means for elevating the pan as the chickens grow in size and height.

A further object is to provide a stand that will be inexpensive to manufacture, simple and easy to adjust to various heights of the fountain and durable.

We accomplish the above and other objects which will hereinafter appear, by the means illustrated in the accompanying drawing which is a view in elevation and partial vertical section of a fountain supported by our invention.

A drinking pan 1 has an outwardly projecting turned or rolled edge 2, and in the form here shown, it has a bottom with a centrally raised portion 3 to provide a passage for the flow of liquid from an inverted vessel 4 seated in a cup 5, with flat, over-extended bottom which is spot welded to the portion 3. The over-extension of the cup bottom is formed with openings 14 through which the contents of the vessel 4 discharges.

The vessel 4, as here shown, is a quart jar made of glass such as is commonly used for canning fruit.

The above described mechanism comprising the fountain may be otherwise constructed, as is commonly instructed in the automatic drinking fountain art, except that the pan 1 shall have the outwardly projecting rolled edge 2.

Our improved stand comprises a horizontal continuous metal band-ring 6, supported by legs 7, here shown as three in number, but the number may be increased. These legs are each formed of wire having an end spot welded to the band 6, in the manner shown.

Each leg is provided with a series of outwardly directed formations 8, alike for each leg, formed by bending the wire at right angles at 9, continuing the wire outwardly to form a horizontal supporting portion 10, then bending it inwardly at 11 to form an inwardly and upwardly oblique portion 12, which joins the leg with an obtuse angle 13.

These bends produce a recess-like support for the projecting edge 2 of the pan, which is seated in a corresponding formation 8 of each of the legs. The pan is supported on the horizontal portions 10.

The legs are of spring wire and normally spring inwardly of the stand as indicated by the dotted lines 7'. Therefore the legs are under tension against the pan-edge 2 when the pan is held by them, and this tension prevents accidental release of the pan.

On account of the upward slope of the oblique leg portions 12, a lifting up of the pan, fountain and all, will easily press out the legs and allow the pan to be lifted to the notches above, when the growth of the chicks requires a higher drinking level for the pan.

The lower ends of the legs are preferably bent outwardly as shown, to increase the area of the base and consequent stability of the stand.

Having thus fully described our invention, what we claim as new and desire to secure by Letters Patent, is—

1. The combination with a drinking fountain comprising a pan with an outwardly projecting edge and a conically raised bottom and an inverted jar seated on the pan bottom and movable therewith, of a stand having resilient legs each formed with a series of corresponding edge supporting members which resiliently engage the edges of the pan.

2. The combination with a drinking fountain comprising a pan with an outwardly projecting edge and a conically raised bottom and an inverted jar seated on the pan bottom and movable therewith, of a stand comprising a series of legs formed out of spring-wire having pan-edge supporting recesses, said legs normally springing inwardly to press the edge when the pan is supported by the legs.

3. The combination with a drinking fountain comprising a pan with an outwardly projecting edge, and a conically raised bottom and an inverted jar seated on the pan bottom and movable therewith, of a stand comprising a band-ring and a series of supporting legs fixed to the ring, said legs being formed of spring wire normally springing inwardly and each formed with a series of corresponding recesses to engage the rim of the pan formed by bending the wire to produce a horizontal rim-supporting portion and an upwardly oblique portion connecting the leg with the outer end of the horizontal portion.

In testimony whereof we affix our signatures.

KENNETH HUGHES.
JOSEPH WILLIAMS.